United States Patent [19]
Carver

[11] Patent Number: 5,850,554
[45] Date of Patent: *Dec. 15, 1998

[54] COMPILER TOOL SET FOR EFFICIENTLY GENERATING AND EASILY MANAGING MULTIPLE PROGRAM VERSIONS OF DIFFERENT TYPES

[75] Inventor: Timothy M. Carver, Hillsboro, Oreg.

[73] Assignee: Intel Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 578,176

[22] Filed: Dec. 29, 1995

[51] Int. Cl.$^6$ ............................................. G06F 9/45
[52] U.S. Cl. ................................. 395/710; 395/705
[58] Field of Search ............................ 395/712, 703, 395/705, 701, 709, 710, 706, 707, 708

[56] References Cited

U.S. PATENT DOCUMENTS

| | | | |
|---|---|---|---|
| 4,558,413 | 12/1985 | Schmidt et al. | 364/300 |
| 4,809,170 | 2/1989 | Leblang et al. | 364/200 |
| 5,175,856 | 12/1992 | Van Dyke et al. | 395/700 |
| 5,193,191 | 3/1993 | McKeeman et al. | 395/700 |
| 5,303,376 | 4/1994 | Taki | 395/700 |
| 5,561,800 | 10/1996 | Sabatella | 395/700 |
| 5,561,803 | 10/1996 | Kilis | 395/700 |

*Primary Examiner*—Alvin E. Oberley
*Assistant Examiner*—St. John Courtenay, III
*Attorney, Agent, or Firm*—Blakely, Sokoloff, Taylor & Zafman LLP

[57] ABSTRACT

A compiler tool set manages the complexity of efficiently maintaining multiple versions of a program. This tool set generates various version types of a program in a manner that is easy to use, that is compatible with existing program generation build scripts and makefiles, and that minimizes recompilation. When the compiler of the present invention is invoked by a programmer command, a build script, or a makefile, it produces an augmented object file that contains sufficient information to subsequently generate different versions of the program. Subsequently, the linker of the present invention is invoked specifying the augmented object files to be linked and the version type to be produced as an executable file. The linker maintains a program and object module database that can hold substitution object modules corresponding to each (augmented object file, version type) pair. If any substitution object modules required to satisfy the user's request are missing or are not current in the database, then the linker invokes the compiler to generate them from the augmented object file. Function-by-function equivalence detection and dependency analysis minimize the number of substitution object modules recompiled. Any change in either a module's semantics or in its optimization decisions invalidates all old versions of the module. Finally, the linker places any newly compiled substitution object modules in the database, and builds the specified executable file from the appropriate substitution object modules from the database.

45 Claims, 8 Drawing Sheets

COMPILER TOOL SET FOR EFFICIENTLY GENERATING AND EASILY MANAGING MULTIPLE PROGRAM VERSIONS OF DIFFERENT TYPES

FIELD OF THE INVENTION

The present invention relates to software tool sets for compiling and linking source programs into executable programs. In particular, it relates to automatic management of multiple versions of object programs and efficient automatic generation of multiple versions of executable programs.

BACKGROUND OF THE INVENTION

Programmers typically write computer programs in a high-level language, such as C or LISP. A program called a compiler translates or compiles the source files containing the high-level language statements written by the programmer into corresponding object files or modules. A program called a linker then links or combines these object files into a program suitable for execution or running on a programmable computer. A typical program is revised, compiled and linked many times during its development.

A programmer often works with different versions of a program during different phases of its development process. For example, the compiler can typically insert one or more of a range of debug options into the executable code. Such options can be effective at saving the programmer time and effort early in the software development process—for example, array bounds checking can assure that an index into an array is not out of range and pointer validity checking can ensure that a pointer variable points within the program's data space. Also, the symbolic names of the data objects and functions as defined by the programmer in the high-level source language can be placed into the executable program for use by an interactive debugger at run time.

Later in the software development process, the program may be functioning correctly but its execution may need to be sped up. The programmer can typically specify that the compiler apply one or more of a range of optimization options to his program.

For example, if a function is frequently called at a particular point or site in a program, rather than compiling a "Jump to Subroutine" instruction to transfer control to that function elsewhere in memory, the actual instructions of the function can be placed in line at that call site. While this results in a somewhat larger program, it saves the "overhead" time required by that jump instruction, by the corresponding return instruction, and by any delays that may occur due to memory addressing or accessing.

One common prior-art approach to generating and managing the versions of various types required while developing a program is to simply let the programmer handle the details explicitly. FIG. 1 shows the files and program invocations used in this prior-art approach. The example shown in FIG. 1 produces three different versions of an executable program, 125 to 127, from the current revision of the source of the program, which is contained in N source files, represented by source files 101 to 103.

To produce the "D" version of the executable file, such as a version with a particular debug feature, source files 101 to 103 are first compiled with the "D" switch of the compiler set. In compilation step 134, source file number 1, 101, is compiled with the "D" switch set to produce the "D" version of object file number 1, 137. Compilation step 144 produces the "D" version of object file number 2, 147, from source file number 2, 102. Compilation step 154 produces the "D" version of object file number N, 157, from source file number N 103. Subsequently, link operation 110 produces the "D" version of the executable program file 125 from object files 137, 147, and 157.

Similarly, the "I" version of the executable program, 126, is linked from the "I" versions of the three object files, 138, 148 and 158. These are respectively produced by compiling the three source files, 101 to 103, with the "I" switch. These "I" versions may be ones in which instrumentation options are used so that the program produces a run-time profile of which jumps are taken how often, such as counters indicating how many times each code block was actually executed. Thus, an instrumented program gathers statistics on its own behavior. These run-time statistics can be used to make sophisticated optimization decisions.

Similarly, the "O" version (e.g., a version with one or more optimization switches set) of the executable program, 127, is linked from the "O" versions of the three object files, 139, 149 and 159. These are respectively produced by compiling the three source files, 101 to 103, with the "O" compilation switch set.

In the example in FIG. 1, there are nine different object files or modules—one for each (source file, compilation option) pair. A large program may be divided into tens of source files. A compiler may support dozens of different options. Thus, in this prior art approach, the user must name each object file uniquely, or put them in different directories corresponding to the different switch options, and/or delete them when they become unneeded as the software development process goes on.

Further, programmers spend much of their time in an edit-compile-execute loop, in which revisions are made to the program'source files, which are then compiled into an executable program, which is then tested. Each cycle around that edit-compile-execute loop may entail the user having to explicitly perform an action to handle the complexity introduced by this proliferation of object files.

Thus, a tool is needed that assists the user in managing the complexity of generating executable files of multiple version types.

FIG. 2 shows the additional complexity introduced when program-wide optimizations are performed based on profiling the actual execution of the program. After editing the source files, the programmer starts 201 the compile and link process by removing all old object, executable, and run-time profile files (step 202). Then in step 203, an instrumented version of the program is compiled and linked. Then in step 204, this program version is debugged, which may result in several iterations through the edit-compile-execute loop, shown by path 209, which returns the user to step 202.

When the instrumented program version is successfully debugged, the programmer proceeds on to step 205, in which the instrumented program version is executed against typical or test inputs to obtain a run-time profile file. From this information, sophisticated optimizations can be made, such as placing data objects that are frequently referred to in fast memory or inter-module function inlining to optimize performance of frequently executed function call sites.

Next, in step 206, the programmer removes all old object and executable files. In step 207, the program is compiled and linked with the "program-wide optimization" switch set. This compilation uses the information in the run-time profile file, upon which optimization decisions are based.

Next in step 208, the user debugs the optimized program version. Path 211 shows the edit-compile-execute loop, in which the programmer goes back to recompile and re-link an instrumented program version. Eventually, this part of the program development process ends in step 212 when the optimized program version is debugged.

In steps 201 and 206, all previous object and executable files are deleted, and thus all must be recompiled in steps 203 and 207. For large programs, such a complete recompilation can require hours of computing time, a substantial portion of which is actually unneeded. Thus, a tool is needed that generates executable files of multiple version types efficiently without unneeded recompilations.

One prior art system automatically performed essentially the steps shown in FIG. 2. This system performed global optimization at link time without making any attempt to reuse existing optimized code, i.e. its equivalents to steps 201 and 206 deleted all previous versions of object files. A compiler option generated object files that contained the compiler intermediate form. Then at link time, the entire program was compiled at once into an optimized executable version. No provision was made for reusing existing compilation results within the same version type. No provision was made for managing compilation results for multiple version types.

Thus, a tool is needed that assists the user in managing the complexity of generating executable files of multiple version types without unnecessary recompilation.

SUMMARY OF THE INVENTION

The present invention is a compiler tool set that manages the complexity of efficiently maintaining multiple versions of a program. This tool set generates debug, optimized, instrumented, normal, and other version types of a program in a manner that is easy to use, that is compatible with existing program generation build scripts and makefiles and that minimizes recompilation.

When the compiler process of the present invention is invoked by a programmer command, a build script, or a makefile, it produces an augmented object file that contains sufficient information to subsequently generate different versions of the program. Subsequently, the linker process of the present invention is invoked specifying the augmented object files to be linked and the current substitution option, i.e., the version type to be produced as an executable file. Different augmented object files within the same program can be specified to be of different substitution options.

The linker maintains a program and object module database that can hold substitution object modules corresponding to each (augmented object file, version type) pair. This capability allows users to maintain programs compiled in several different ways without having to explicitly maintain multiple sets of object modules.

If any substitution object modules required to satisfy the user's request are missing or are not current in the database, then the linker invokes the compiler to generate them from the augmented object file. The linker places any newly compiled substitution object modules in the database, and builds the specified executable file from the appropriate substitution object modules. The linker also updates the program and object module database with any new information such as run-time profiles or optimization decisions.

The present invention does not add any unusual user-visible compilation steps. It automatically compiles and substitutes optimized, debugging or instrumented modules at link time. The substitution modules are managed in a database out of the user's view. The substitution process is completely encapsulated within the user's normal link step, thus allowing program-wide optimizations to be used with existing build scripts and makefiles. The user may also provide to the linker run-time profile information for use in performing program-wide optimizations, such as inter-module function inlining.

The augmented object file and the program and object module database of the present invention include representations of the source program suitable for determining if current and previous revisions of its functions and data objects are functionally equivalent. Transparently to the user, function-by-function equivalence detection and dependency analysis are used in the present invention so as to minimize the number of substitution object modules that are recompiled because they depend on an augmented object file recompiled by the user. In order to guarantee producing exactly the same executable code as would be produced without dependency analysis, an old version is invalidated by any change in the semantics of the module (e.g., in its source code or header files, or in its optimization decisions).

In one embodiment of the present invention, recompilation occurs at the granularity of augmented object files whenever any function or any data object within the augmented object file changes. In another embodiment of the present invention, recompilation occurs at the granularity of the specific functions or data objects that have changed.

The augmented object files and the program and object module database optionally include a control-flow graph and an estimated run-time profile of each function for making optimization decisions. These optimization decisions include determining what function-call sites are inlined and what data objects are placed in fast memory based on program-wide information such as run-time profiles. These profiles can either be extracted from actually executing an instrumented version of the program or can be estimated by the compiler.

In one embodiment of the present invention, the C programming language is used both as the language in which the compiler and linker are written and as the source language that they compile and link.

BRIEF DESCRIPTION OF THE DRAWINGS

The invention is illustrated in the following drawings, in which known circuits are shown in block-diagram form for clarity. These drawings are for explanation and for aiding the reader's understanding. The invention should not be taken as being limited to the preferred embodiments and design alternatives illustrated.

DETAILED DESCRIPTION OF THE INVENTION

Overview

Figure 1:
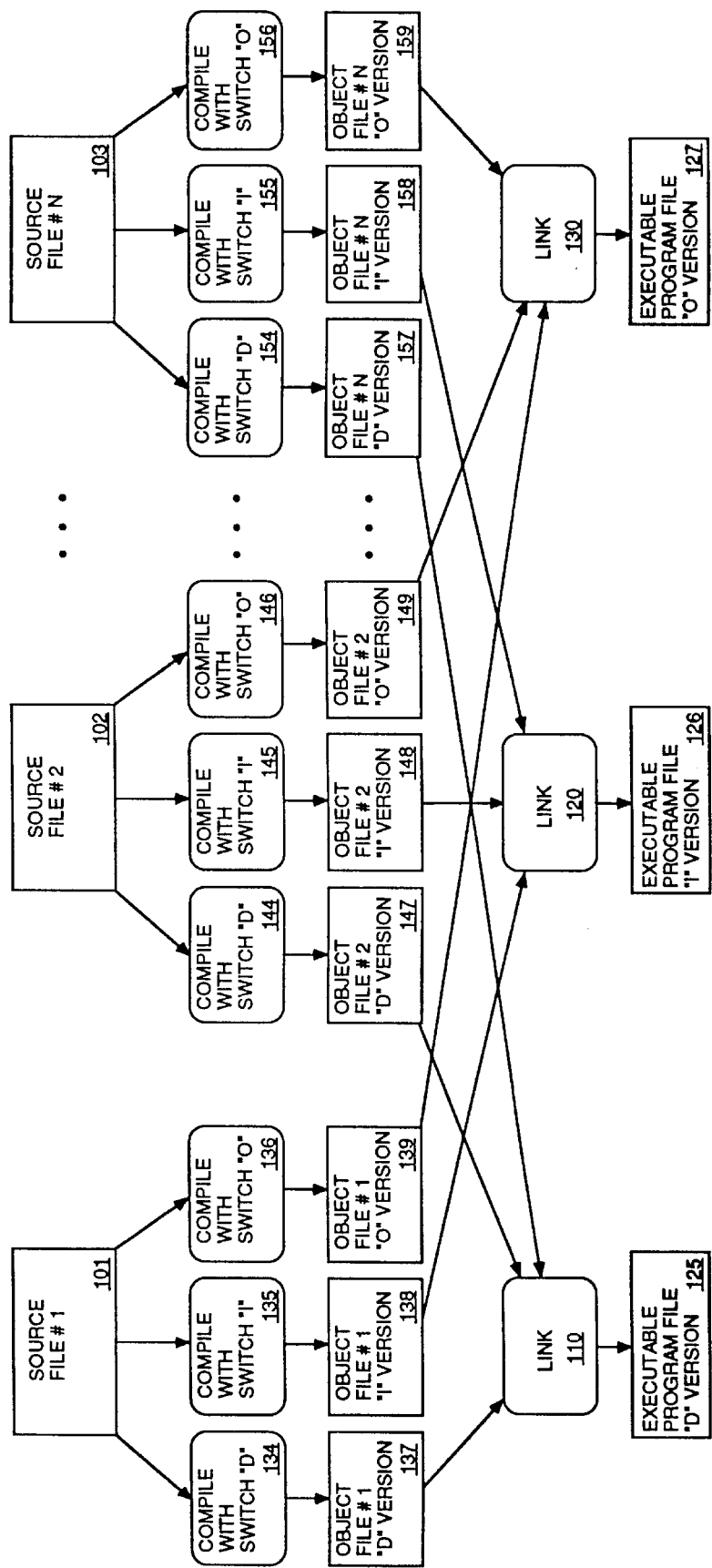
FIG. 1 shows how, in the prior art, the N source files of an example program are each compiled into three sets of N object files, each set corresponding to three version types. The N object files of the same version type are then linked into the executable program file for that version type.
Figure 2:
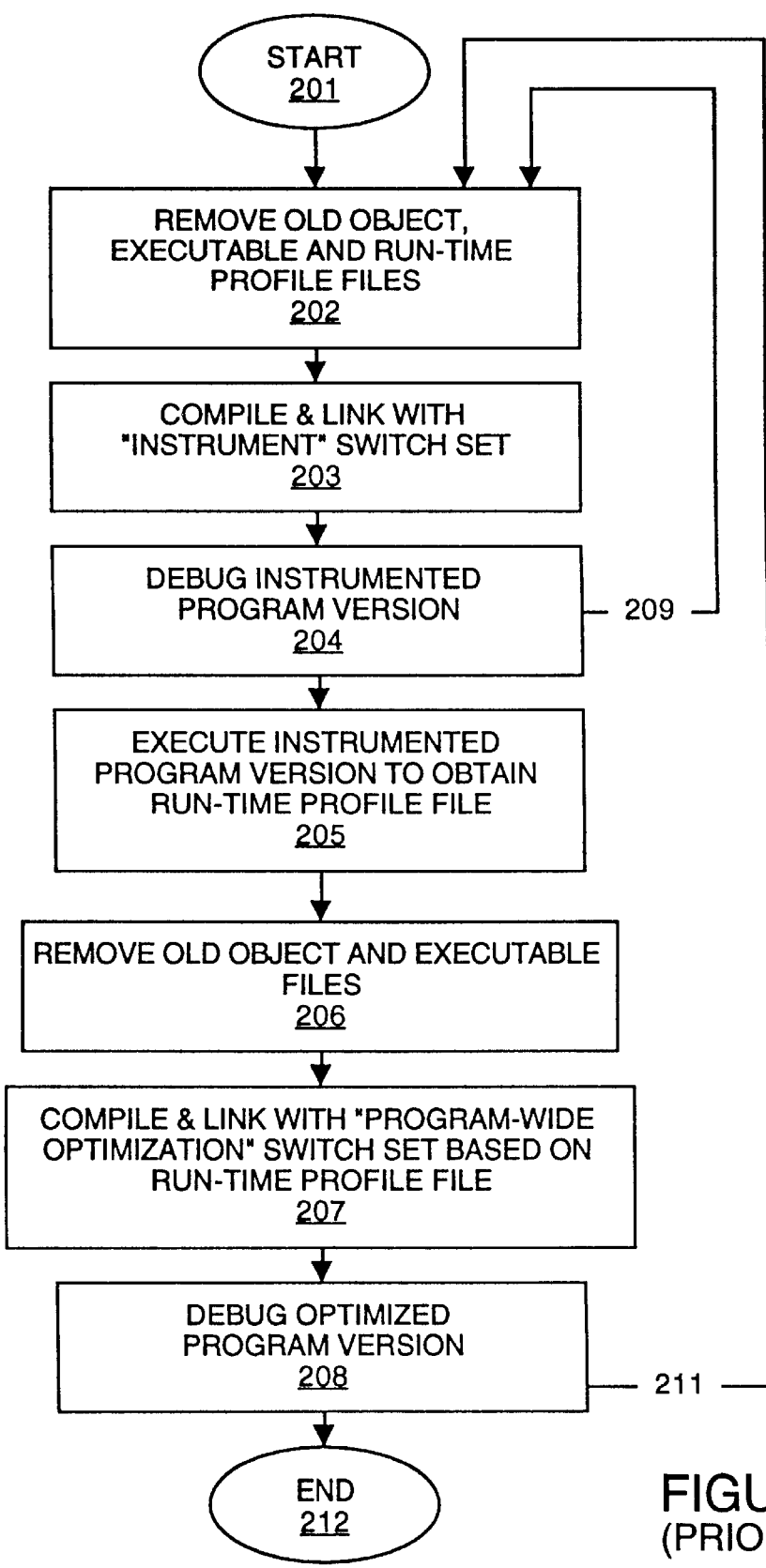
FIG. 2 shows the steps, in the prior art, that a programmer goes through to produce an executable program that includes program-wide optimizations based on a run-time profile generated by an instrumented program version.

Various alternative embodiments of and designs for the present invention are disclosed herein. The invention, however, should not be taken as being limited to the embodiments and design alternatives described. One skilled in the art will recognize alternative embodiments and various changes in form and detail that may be employed while practicing the invention without departing from its principles, spirit or scope.

In the last few years, some compiler tool sets have made sophisticated program-wide and profile-directed optimizations available to software developers. These optimizations (such as profile-directed inter-module function inlining) have shown great promise, with run-time improvements of 15% or more having been shown for some applications. The compiler tool set of the present invention improves the ease of use and the compile-and-link performance of these sophisticated optimizations.

Program-wide optimizations involve the collection of auxiliary information during an initial compile and link of all modules in the program. The complete program view is then presented to a step during which high-level global optimization decisions are obtained. The program view and the global decisions are used during a final compile of the modules selected for program-wide optimizations.

Since inter-module information is used in the final compile step, changes to any source module can potentially cause changes in the final code for any one or more of the modules subject to program-wide optimization. Thus, a traditional separate compilation model cannot be safely used to help reduce the number of final recompilations. Users must conservatively force recompilation of their entire programs after changes to any of their modules. Unfortunately, it is often the case that many or most of the recompilations are unnecessary, because only changes to frequently executed or very widely used code cross module boundaries.

Another common prior-art approach to generating and managing the various program versions in the software development process is for the programmer to write build scripts and makefiles. A build script is a sequence of commands, such as compiler or linker invocations, that results in an executable program being generated or built. A makefile is a list of object files and executable files, each with an associated command sequence that generates the listed object or executable file from source and object files.

Using a makefile, when the user requests that a particular executable file be made, the associated command is looked up in the list. If an object file that is required by that command is not present, then that object file is itself looked up in the list. The programmer's request may be automatically expanded into a series of compilation and linker invocations to generate the file the programmer explicitly requested.

However, neither build scripts nor makefiles can automatically reduce unneeded recompilation because they do not have access to sufficiently detailed information about what changes have been made since the previous compilation or link step.

Software development teams often have a substantial investment in build scripts and makefiles that help automate the process of producing executable program files. The present invention does not require that such makefiles and build scripts be rewritten or used in unusual ways in order to make them work with program-wide and profile-directed optimizations. Extra steps are not needed with the present invention—steps such as invoking a global decision making step, recompiling of all object modules, maintaining multiple version types of object modules, and ultimately naming the correct set of modules at link time. Rather, existing build scripts and makefiles are usable for program-wide and profile-directed optimizations with few or no changes.

The present invention removes extra steps from the user interface by adding a substitution mechanism to the linker. In a substitution, users supply regular expressions naming sets of object modules to be replaced in the linker output, together with strings containing the compiler optimization switches to be used when compiling the replacement modules. The substitution modules are automatically managed in program and object module database 323, and are never directly accessed or seen by users.

When substitutions are requested, the linker invokes the global compiler optimization decision step. During this step, global optimization decisions are made and compilations are issued as needed to implement these decisions. After the decision step, the linker replaces the specified modules in the output with their optimized versions.

Since the global decision making, optimized code generation, and final substitution steps are encapsulated within the link step, build scripts and makefiles need not even know that these steps exist. Users obtain program-wide and profile-directed optimizations by simply adding the appropriate switches to their linker flags at application build time.

Figure 3:
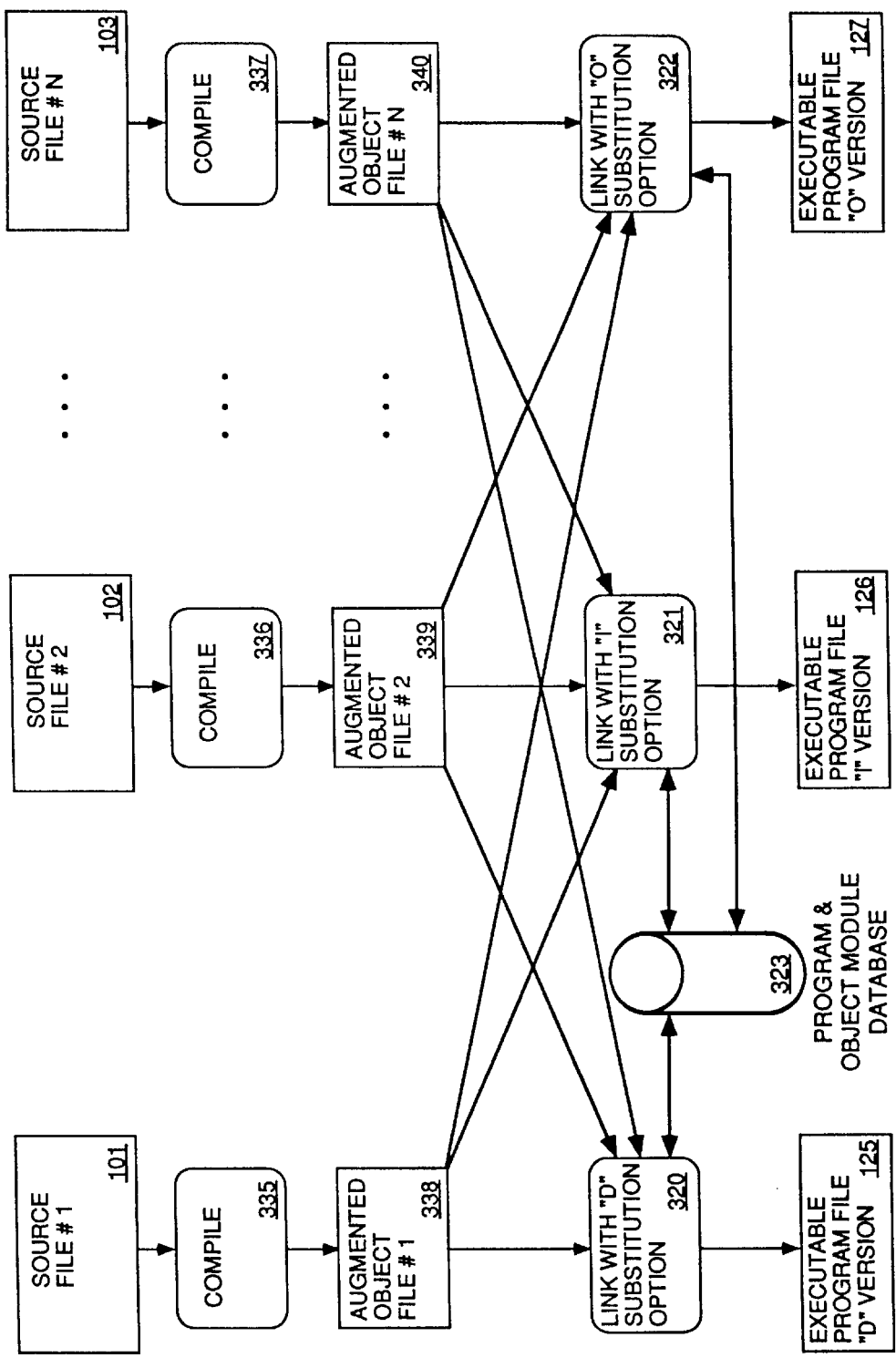
FIG. 3 shows how, according to the present invention, the N source files of an example program are each compiled into a single augmented object file, and these augmented object files are linked into an executable program file for any version type.

FIG. 3 is a data flow diagram of an example compilation, link and substitution process according to the present invention. As in FIG. 1, the source code of the program is contained in N files, represented by 101, 102, and 103, and a "D" version 125, an "I" version 126, and an "O" version 127, of the executable program file are produced. The "D", "I" and "O" versions are selected by means of user-specified substitution options.

In compile steps 335 to 337, source files 101 to 103 are respectively translated into augmented object files 338 to 340, which are visible to the user and for some purposes are equivalent to prior-art object files. The user may specify compile switches in these steps 335 to 337, but they would not be compile switches that specify a program's version type. They may, for example, determine conditional inclusion of program source statement as specified in the source program, or the handing of features such as sign extension for certain data types.

All three augmented object files are inputs to each of the "D" substitution object link 320, the "I" substitution option link 321, and the "O" substitution option link 322. Each of these link processes reads and writes program and object module database 323. Each produces the executable program file 125, 126, or 127 of the version specified by the user in the substitution option supplied to the link step.

While the initial inputs and final outputs of FIGS. 1 and 3 are the same, the present invention only has one augmented object file for each source file regardless of the number of compilation or substitution options employed.

Also, the substitution option or version type desired is specified by the user at link time, not at compile time. Recompilation time is substantially reduced in the present invention by utilizing program and object module database 323.

The Augmented Object File

Figure 4:
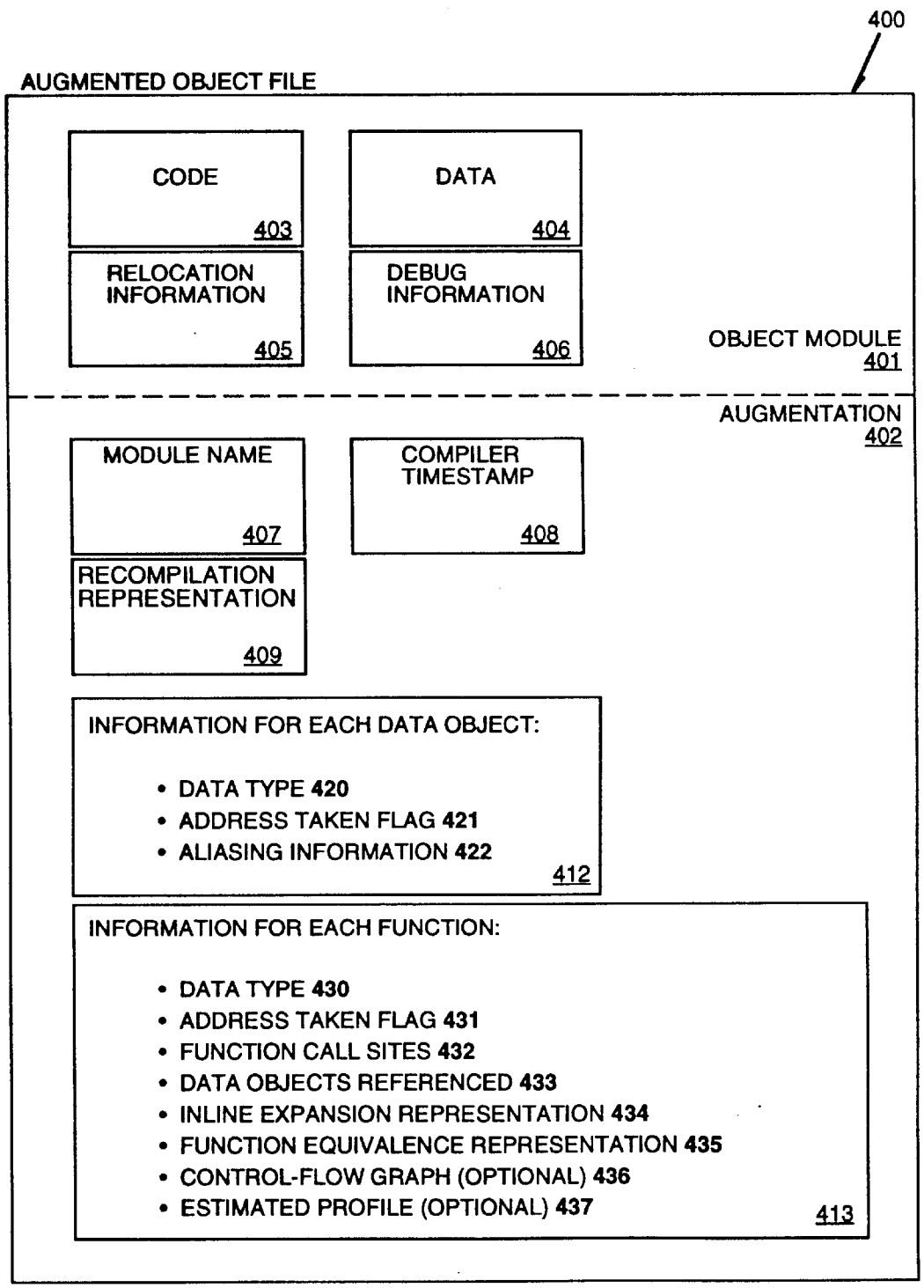
FIG. 4 shows the information contained within an augmented object file according to the present invention.

FIG. 4 is a high-level data structure diagram for augmented object file or module 400. It contains object module 401 as well as augmentation 402. The augmented object modules differ from "ordinary" object modules only in that extra symbolic information is embedded in them. Thus, such modules can also be linked into programs which do not use program-wide optimizations with no adverse effects. This property is particularly useful when constructing object libraries to be linked with programs which may or may not use program-wide optimizations.

Object module 401 is equivalent to an object file in the prior art. Object module 401 contains code 403, data 404, relocation information 405, and debug information 406. Code 403 is executable machine instructions and other read-only information, such as jump tables and literals. Data 404 contains space allocations, and in some cases initial values, for statically allocated data objects. Relocation information 405 contains symbolic references to code and data addresses which are resolved during the linking or loading processes.

Debug information 406 contains information which establishes a mapping between the locations and objects within code 402 or data 403 and the symbols within the high-level language source of the program being compiled and linked. The symbols and this mapping is interpreted by a symbolic debugger tool, which can be used interactively by the programmer to debug the program.

Augmentation 402 contains module name 407. Module name 407 is a text string that identifies the augmented object file, or module, uniquely among the other modules in the program being linked. Module name 407 is used to identify the augmented object module and the object files for specific substitution options that correspond to it or that are generated from it.

In one embodiment of the present invention, the name of the first public initialized data object or function in the module is used as module name 407. It is undesirable to use the augmented object file name as module name 407. File names can be changed at will by the programmer and they need not be unique within the program being compiled and linked—files of the same name could be located within different directories. In contrast, duplicates are not allowed among the public function and data object names within a program.

Augmentation 402 also contains compiler timestamp 408. Compiler timestamp 408 is used to determine whether or not the user or programmer has recompiled an augmented object file since information about it was last entered into program and object module database 323.

In one embodiment of the present invention, compiler timestamp 408 is the date and time when the compiler generated the augmented object file or module from the corresponding source file. Compiler timestamp 408 need not be a timestamp. In another embodiment of the present invention, it is a counter that assigns a unique ID each time that the compiler is invoked. It could be any identifier that distinguishes between compiled instances of the same module.

In one embodiment of the present invention, at the end of the compilation process (i.e. at the end of the assembly process within the compilation process), the augmented object file produced is compared with its previous version. If the only difference found is the timestamp, then the timestamp is reverted back to the old timestamp, thus avoiding unnecessary recompilations of the substitution object modules that correspond to that augmented object module.

Augmentation 402 also contains recompilation representation 409. Recompilation representation 409 is a representation of the module suitable for recompiling it without recourse to the original source code. Recompilation representation 409 is input to any needed substitution recompilations that occur within the link process of the present invention.

In one embodiment of the present invention, the C programming language is supported and recompilation representation 409 includes preprocessor output from the original, user-invoked C-language compilation of the module, plus whatever user-specified compilation options were specified in that compilation.

Augmented object file 400 also contains information 412 for each data object defined within data 404. Data object information 412 includes, for each data object, its data type 420, its address taken flag 421, and any aliasing information 422 it may have. Aliasing information 422 identifies each of the names or aliases by which the data object may be referenced within the source code of the program being compiled and linked.

High-level languages usually characterize each data object as having one particular data type. For example, a data object may be of type array, type character, type integer, type floating point (of a specified precision), type Boolean (zero/one) or type aggregate (a concatenation of components of specified types). Data type 420 identifies the data type of the data object which it describes.

Address taken flag 421 is simply a Boolean value describing whether or not the address of the data object which it describes has been taken into a pointer variable. If so, certain optimizations are not permitted, such as rearranging (to optimize instruction scheduling) the order of load and store instructions that involve pointer variables.

Augmented object file 400 also contains information 413 for each function defined within code 403. Function information 413 contains, for each function, its data type 430 and its address taken flag 431, which are respectively analogous to data type 420 and address taken flag 421 of data object information 412.

Function information 413 also contains, for each function, the functions it references and the call sites at which it references them 432, the data objects it references 433, its inline expansion representation 434, and its function equivalence representation 435.

Function call sites 432 is used in making optimization decisions such as profile-directed inter-module inlining of functions.

Inline expansion representation 434 comprises a representation of the function suitable for inline expansion into its call-sites within the other functions. These call-sites may be in other modules besides the one where the function is defined. In one implementation of the present invention, the C compiler's internal intermediate representation of the function is used for inline expansion representation 434.

Function equivalence representation 435 comprises a representation of the function suitable for comparing it with a previous version of the same function to determine if the meaning of the function has changed between the two. Such a change could come from a change in the source code made by the programmer, or a change in the compilation options selected by the user when the function is originally compiled into an augmentation object file.

In one embodiment of the present invention, function equivalence representation 435 is the C-language compiler's internal intermediate representation for the function plus the original compile switches specified by the user.

It is desirable that function equivalence representation 435 not vary with irrelevant changes. For example, absolute line numbers within the module should not be included because they may change if other functions within the module change even if that function does not.

Optionally, function information 413 contains, for each function, its control-flow graph 436 and its estimated profile 437. These are useful in program-wide optimizations such as determining what function call sites to inline and what data objects to place in fast memory.

Estimated profile 437 is generated by the initial compilation as the compiler's estimate of the functions profile. The information equivalent to estimated profile 437 that is contained within program and object module database 323 can either be estimated profile 437, or it can be an actual run-time profile generated by an instrumented version of the program.

Link Process Overview

Figure 5:
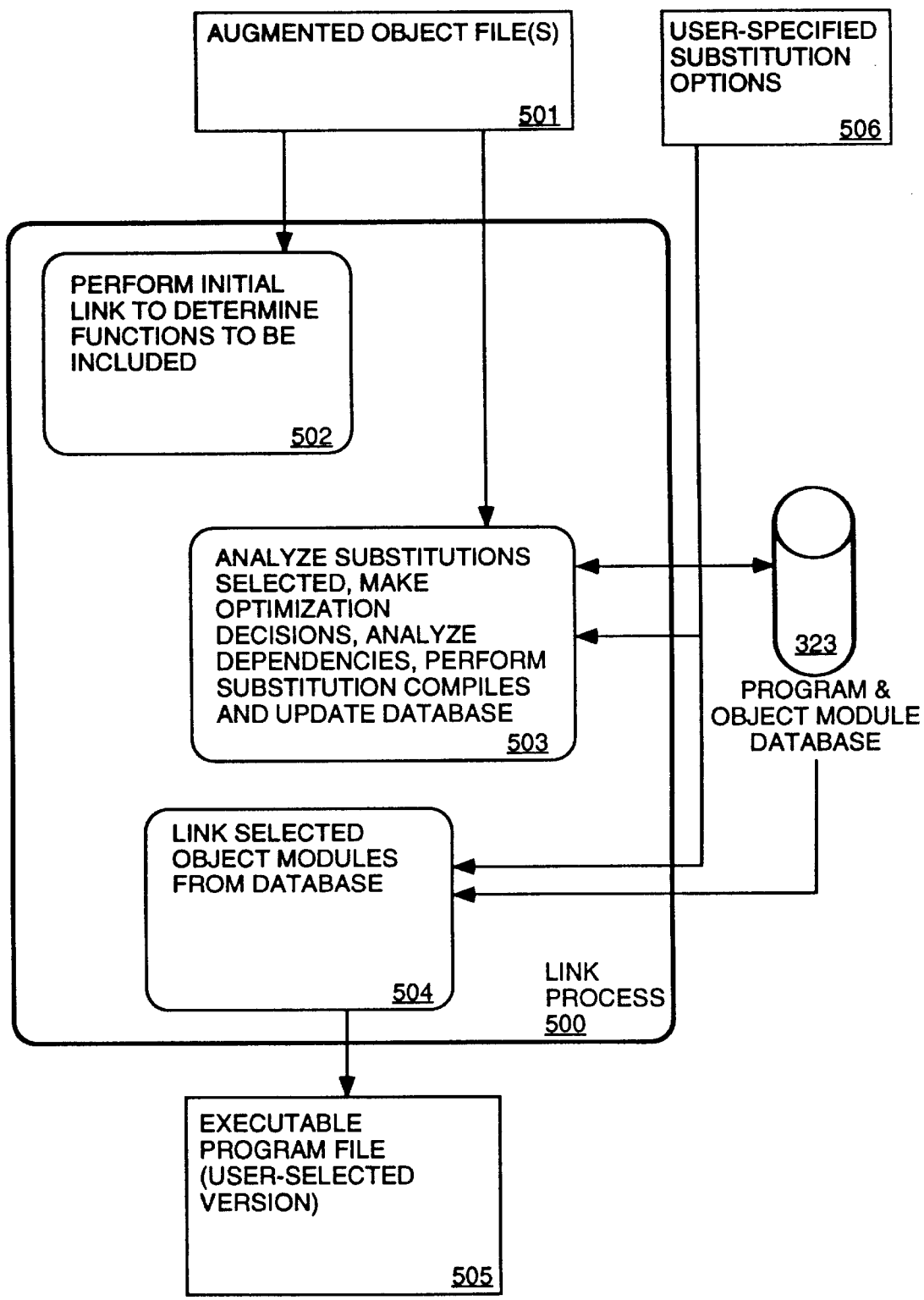
FIG. 5 shows the linker of the present invention, the information it utilizes, the information it produces, and the basic steps it performs.

FIG. 5 is a high-level data-flow diagram for the link process 500 according to the present invention. Augmented object file(s) 501 are input to link process 500, along with user-specified substitution options 506. Link process 500 includes steps 502, 503, and 504. The substitution recompilations and the function-by-function equivalence detection and dependency analysis of the present invention are encapsulated within link process 500 so as to be transparent to the user. Any recompilations needed for the substitutions requested are performed automatically within link process 500.

In step 502, an initial link is performed according to the prior art to determine what functions will be included in executable program file 505. This information is utilized in steps 503 and 504. This initial link is performed, as in the prior art, using relocation information 405.

In some embodiments of the present invention, some of user specified augmented object file(s) 501 are omitted from any further consideration in link process 500 because none of the data objects or functions that they define are actually going to be used within executable program file 505. This is highly desirable where standard library files are used, in which case the programmer may be unaware of which library file contains the functions or data objects that his program references.

In step 503, the user-specified substitution options are analyzed and associated with each of user-specified augmented object file(s) 501 to which they apply. In one embodiment of the invention, the same substitution options must apply to all functions and data objects within a module, but each module may have its own set of substitution options. For example, the programmer may want to add debug information only to the particular module he believes is troublesome, but not to the whole program which could substantially increase its size and reduce its performance.

Also in step 503, optimization decisions are made. In one embodiment of the present invention, they include determining what function call-sites to inline and what data objects to place in fast memory based on the information in control flow graph 436 and either estimated profile 437 or an actual run-time profile contained in program and object module database 323. It will be obvious to one skilled in the art that there are numerous optimizations that can be supported without departing from the spirit or scope of the present invention.

Also in step 503, a dependency analysis is performed so as to minimize the number of recompilations performed. As noted earlier, an efficient build environment for program-wide optimizations cannot be engineered with build scripts or makefiles. To address this problem, the present invention incorporates transparent object module dependency analysis into the global decision making and optimization step. This analysis ensures that a substitution module is compiled only when a valid compilation of the requested substitution is not already available in the object module database 323. This analysis incorporates information about how past and current global optimization information propagates between compilation units. After source code changes, the analysis can often limit the recompilation to a single module or some fraction of the substitution modules in the program, depending on the nature of the changes and the kinds of optimizations requested in the substitutions.

In order to guarantee that link process 500 produces exactly the same executable program file 505 as would be produced without dependency analysis, any change either in its semantics or in the optimization decisions that apply to it invalidates an old version of that function. This guarantee is required to ensure reproducibility of both desired and unintentional program behavior.

Also, in step 503, link process 500 invokes the compiler of the present invention to perform any needed substitution recompilations. The resulting object modules are placed into program and object module database 323.

Also in step 503, link process 500 updates program and object module database 323 with any newly acquired information, such as run-time profiles supplied by the user, which may have been generated from running an instrumented version of the program. Also, any newly generated information, such as new optimization decisions, are updated in program and object module database 323. At the end of step 503, program and object module database 323 contains all the needed object modules and program information for the final link.

In step 504, these object modules are linked according to the program information to produce executable program file 505 of the version type corresponding to user-specified substitution options 506.

In one embodiment of the invention, the linker maintains within its internal memory, data structures that essentially duplicate those of program and object module database 323. In this embodiment, step 501 initializes these data structures with information obtained from user-specified augmented object files 501. Step 502 updates program and object module database 323 from the information contained in these data structures.

The Program and Object Module Database

Figure 6:
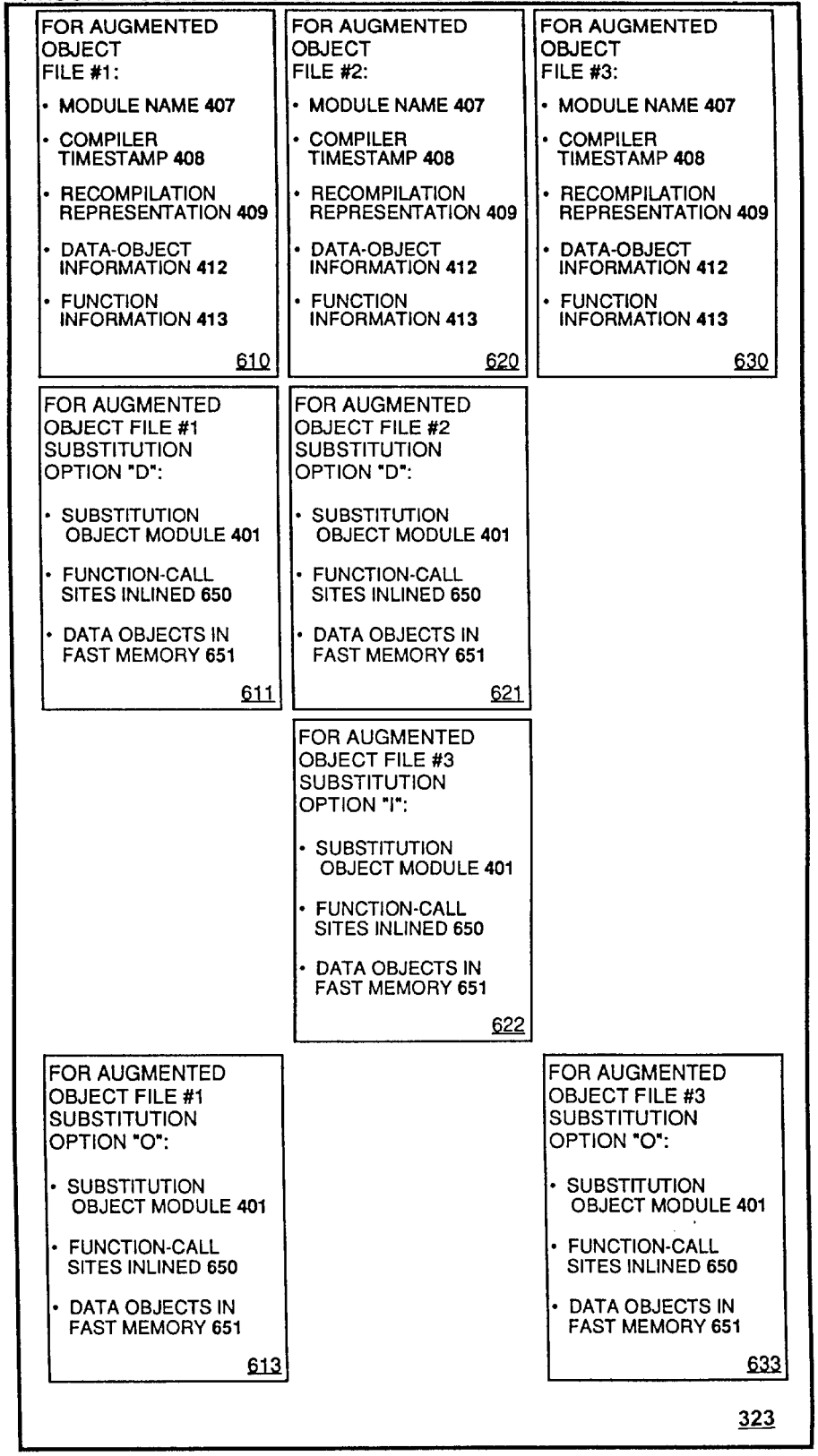
FIG. 6 shows the information contained within the program and object module database of the present invention.

FIG. 6 is a high-level data structure diagram of program and object module database 323. As an example, program and object module database 323 as shown in FIG. 6 corresponds to three augmented object files and three possible substitution options, though not all (module, substitution option) pairs happen to have entries in the database.

Information structures 610, 620, and 630 contain information for each of these three augmented object files. They each contain, for the object file or module to which they correspond, its module name 407, its compiler timestamp 408, its recompilation representation 409, its data-object information 412, and its function information 413. These all are equivalent to the corresponding information within augmented object file 400, except that estimated profile information 437 within function information 413 may be replaced with actual run-time profile information generated by an instrumented version of the program.

Information structure 611 contains substitution object module 640 and the optimization decisions for augmented object file number 1 in the case where it is compiled with substitution option "D". In one embodiment of the present invention, the optimization decisions applicable to a particular version of a particular object file include a specification of what function call sites are to be inlined, or that have been inlined, 650, and a specification of what data objects are to be placed in fast memory, or that have been placed in main memory, 651.

Program and object module database 323 contains a number of information structures for various (object file, substitution option) pairs. In the case of the example database shown, these are blocks 611, 613, 621, 622, and 633. Structures 613, 621, 622, and 633 contain information equivalent to that of structure 611, but pertaining to the particular (object file, substitution option) pair that they describe.

There is no general requirement that all such pairs within program and object module database 323 have current information, or even any information. Rather, program and object module database 323 is a repository for such information if and when it is generated, so as to minimize recompilations. Of course, a link operation requires the complete set of information structures for the (object file, substitution option) pairs actually being linked.

Prior selections of substitution options for each augmented object module can be maintained. In one embodiment of the present invention, information on only the two most recent substitution options is kept for each augmented object module so as to not unduly increase the size of program and object module database 323. In general, the N most recently used versions of the object modules comprising the program are simultaneously maintained, where N is defined when the linker is compiled. Users can experiment with up to N different sets of substitution options per augmented object module before existing alternative substitution object modules are invalidated or deleted.

As one example of how this is useful, substitutions can be used to repeatedly alternate between debug and optimized program versions, with both the debug and optimized substitution modules being transparently managed in the database. Few or no compilations might actually be issued to obtain a requested (debug or optimized) program version, depending on the nature of the changes to the program since the last time the requested version was built.

In one embodiment of the present invention, each substitution object module 640 within program and object module database 323 is maintained in a separate file within a particular directory, called a PDB or program data base directory. A program information file within this same directory contains information structures 610, 620 and 630, as well as function call sites inlined 650 and data objects in fast memory 651 for each (object file, substitution option) pair. Another program information file contains the output of step 502, e.g. what functions and data objects are actually used in executable program file 505.

The Link Process In Detail

Figure 7:
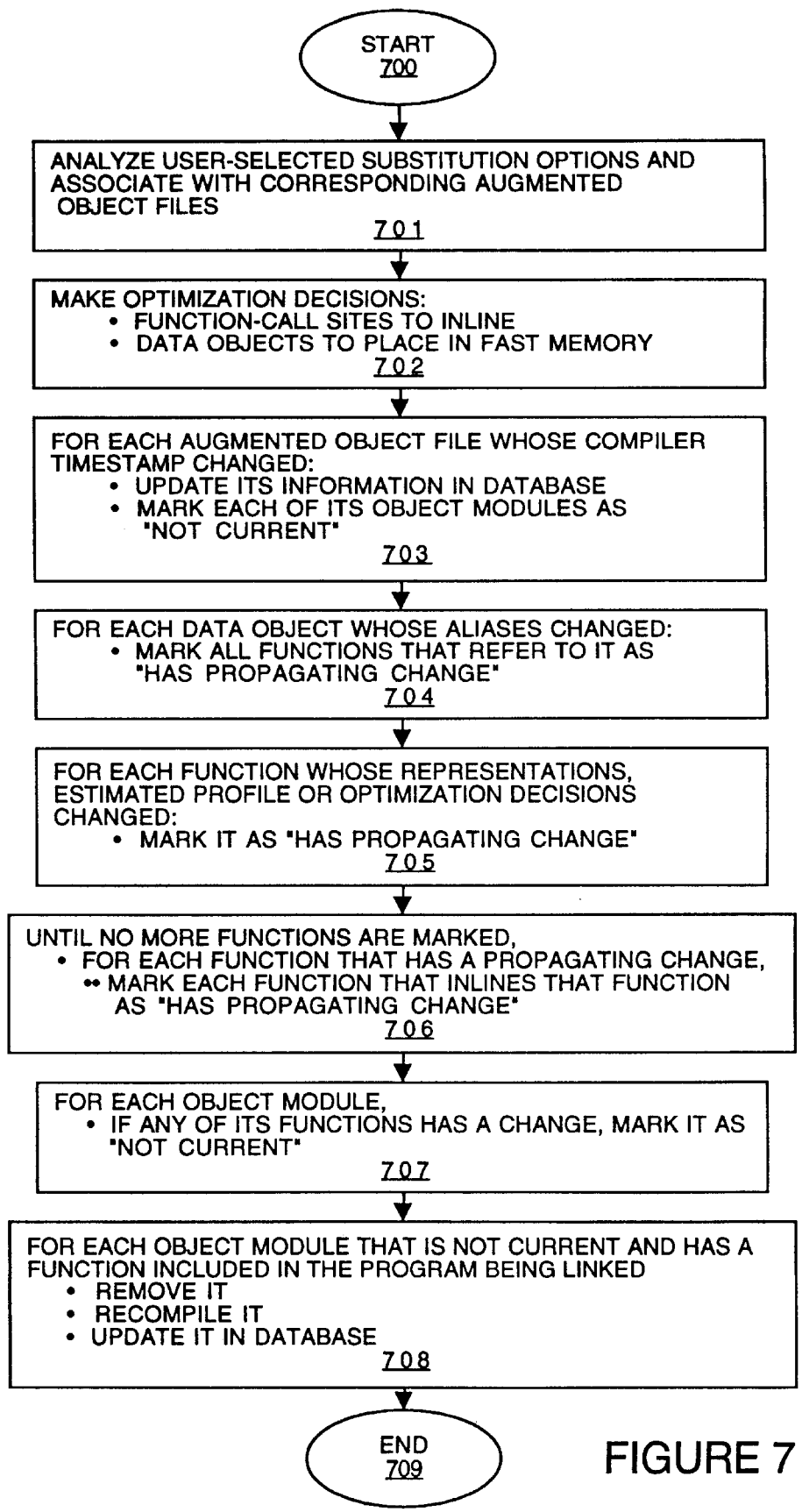
FIG. 7 shows the steps the linker of the present invention performs when it analyzes the substitutions selected by the user, makes optimization decisions, analyzes dependencies, performs substitution compilations, and updates the program and object module database.

FIG. 5 describes link process 500 of the current invention in terms of three high-level steps, 502 to 504. The first and last of these steps are analogous to those in prior-art linkers. FIG. 7 is a flowchart of the sub-steps within the middle step 503.

Step 503 of link process 500, starts with step 701, in which user-specified substitution options 506 are analyzed to determine which substitution option(s) apply to which of augmented object files 501. Different augmented object files to be included within the same executable program can be specified to be of different substitution options.

Next in step 702, the optimization decisions are made for the current (module name, substitution option) pair. As discussed above, these optimization decisions may include what function-call sites are inlined 650, what data objects are placed in fast memory 651, etc.

Next in step 703, the linker goes thorough each of augmented object files 501 whose compiler timestamp 408 has changed. For each such file, all of its information in program and object module database 323 is updated. Also, any object modules corresponding to it within program and object module database 323 are marked as not being current and thus needing recompilation.

A data item, decision or piece of information has "changed", if it is different in the current user-specified augmented object file than it was when the current (module name, substitution option) pair was last compiled, as shown by the contents of program and object module database 323.

Next in step 704, the linker examines the program being linked for any data objects that have any data object information 412 that has changed from the previous revision of the corresponding (module name, substitution option) pair, if any, that is contained within program and object module database 323. For each such data object, each function that refers to it is marked as having a propagating change.

Next in step 705, the linker examines each function within the program being linked to see if its function equivalence representation 435, its estimated profile 437, or its optimization decisions, 650 and 651, have changed. If so, it is marked as having a propagating change.

Next, in step 706, the linker propagates any propagating changes within a function to each function that inlines it—that is to each function that includes the changed function as inline code rather than as a jump to a subroutine. In other words, for each function that has a propagating change, every function that inlines that function is marked as also having a propagating change. This is continued until no additional functions can be marked.

Next, in step 707, the linker examines each object module. If any function within that object module is marked as having a propagating or non-propagating change, then that object module is marked as not current and needing recompilation. Non-propagating changes include a change in compiler timestamps or a changed decision as to whether or not to place a global variable in fast memory.

Next, in step 708, the linker examines each object module. If it is not current or not present, then it is removed from program and object module database 323, and it is recompiled with the appropriate substitution options as determined in step 701. Any such recompiled object modules are placed in program and object module database 323. Also in step 708, link process 500 updates program and object module database 323 with any newly acquired information, such as run-time profiles supplied by the user, and newly generated information, such as optimization decisions.

This ends 709 step 503 of the linker of the present invention. All the information and object modules needed to produce executable program file 505 are now current and contained in program and object module database 323.

In the embodiment of the present invention described above and shown in FIG. 7, recompilation occurs at the granularity of augmented object files. In another embodiment of the present invention, recompilation occurs at the granularity of specific functions or data objects that have changed. This latter embodiment further improves the efficiency of the compiler by further reducing the amount of recompilation performed.

Example Computer System

Figure 8:
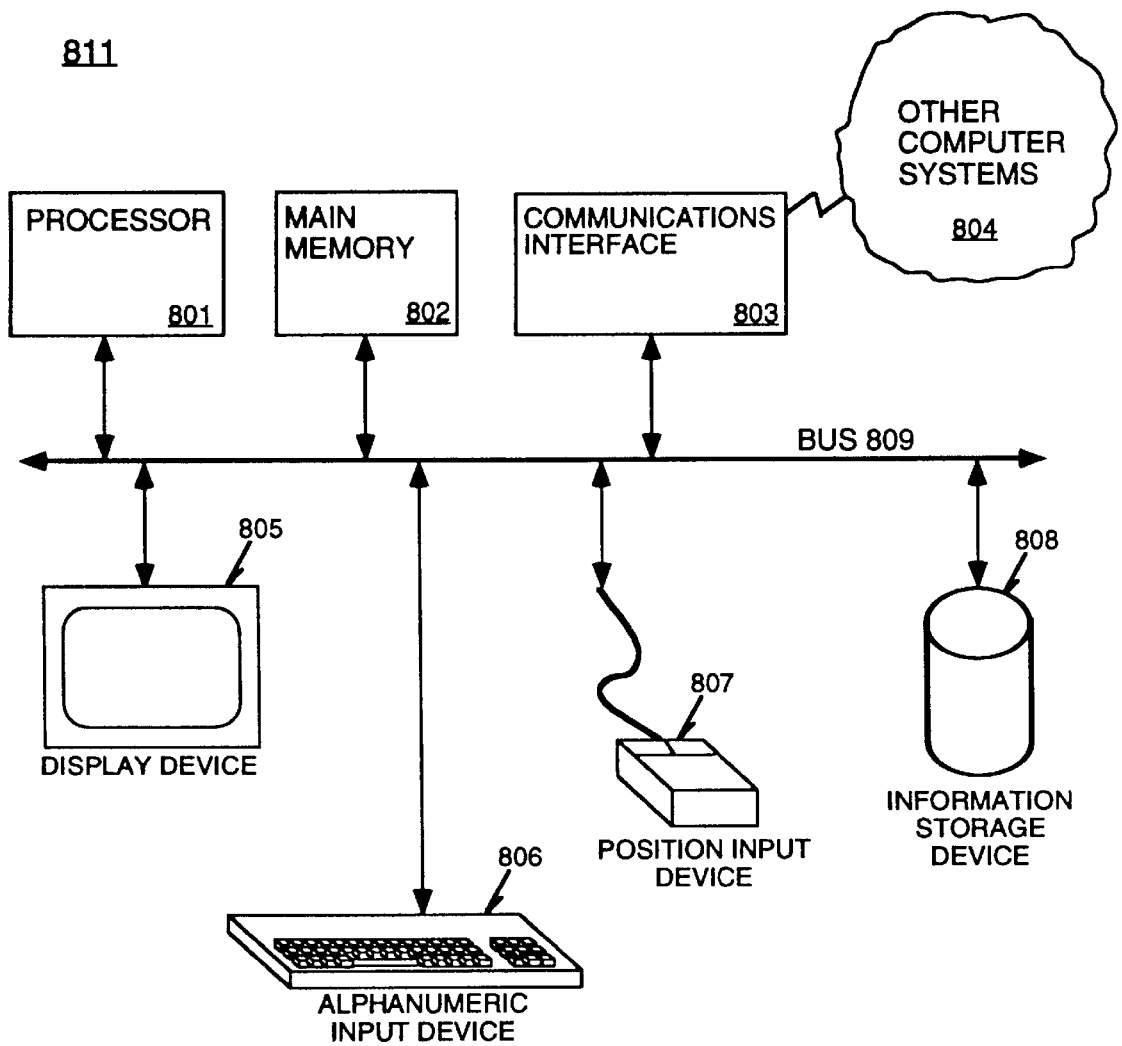
FIG. 8 shows the major components of a programmable computer system within which the present invention can be executed.

FIG. 8 is an architectural block diagram of an example programmable computer system 811 within which various embodiments of the present invention can operate. Computer system 811 typically comprises a bus 809 for communicating information, such as instructions and data. It further typically comprises a central processing unit (CPU) 801, coupled to bus 809, for processing information according to programmed instructions, a main memory 802 coupled to bus 809 for storing information for CPU 801, and a data storage device 808 coupled with bus 809 for storing information. In the case of a desktop design for computer system 811, the above components are typically located within a chassis (not shown).

Processor 801 could be an 80960, 386, 486 or compatible processor made by Intel Corp., among others. Main memory 802 could be a random access memory (RAM) to store dynamic information for processor 801, a read-only memory (ROM) to store static information and instructions for processor 801, or a combination of both types of memory.

In alternative designs for computer system 811, data storage device 808 could be any medium for storage of computer readable information. Suitable candidates include a read-only memory (ROM), a hard disk drive, a disk drive with removable media (e.g. a floppy magnetic disk or an optical disk), or a tape drive with removable media (e.g. magnetic tape), or a flash memory (i.e. a disk-like storage device implemented with flash semiconductor memory). A combination of these, or other devices that support reading or writing computer readable media, could be used.

The input/output devices of computer system 811 typically comprise display device 805, alphanumeric input device 806, position input device 807 and communications interface 803, each of which is coupled to bus 809. If data storage device 808 supports removable media, such as a floppy disk, it may also be considered an input/output device.

Display device 805 may be a liquid crystal display, a cathode ray tube, or any other device suitable for creating graphic images or alphanumeric characters recognizable to the user. Communication interface 803 communicates information between other computer systems 804 and processor 801 or main memory 802.

Alphanumeric input device 806 typically is a keyboard with alphabetic, numeric and function keys, but it may be a touch sensitive screen or other device operable to input alphabetic or numeric characters.

Position input device 807 allows a computer user to input command selections, such as button presses, and two dimensional movement, such as of a visible symbol, pointer or cursor on display device 805. Position input device 807 typically is a mouse or trackball, but any device may be used that supports signaling intended movement of a user-specified direction or amount, such as a joystick or special keys or key sequence commands on alphanumeric input device 806.

It will be clear to one skilled in the art that the compiler/linker tool set of the present invention can operate upon a wide range of programmable computer systems, not just example computer system 811.

Conclusion

As illustrated herein, the invention disclosed provides a novel and advantageous compiler tool set for efficient management of multiple version types of a program. One skilled in the art will realize that alternative embodiments, design alternatives and various changes in form and detail may be employed while practicing the invention without departing from its principles, spirit or scope.

In particular, the data structures within augmented object file 400 or within program and object module database 423 or the steps within link process 500, or the substeps within step 503 of link process 500 could be simplified or augmented in various embodiments of the invention.

The following claims indicate the scope of the invention. Any variation which comes within the meaning of, or range of equivalency of, any of these claims is within the scope of the invention.

What is claimed is:

1. A computer system comprising:
 a compiler to compile a user-specified source program into an augmented object module, and to compile said augmented object module into substitution object modules of a plurality of version types;
 a database to hold said substitution object modules; and
 a linker, coupled to said compiler and to said database, to link a user-specified augmented object module into an executable program of one of a plurality of user-specified version types, wherein if said version type is an ordinary version type, said user-specified augmented object module is linked into said executable program, else said linker to:
  i) determine whether or not said database holds a substitution object module that corresponds to said user-specified augmented object module, that is of said user-specified version type, and that is current;
  ii) if not, then invoke said compiler to further compile said user-specified augmented object module into said corresponding substitution object module of said user-specified version type and place the same into said database; and
  iii) link said corresponding substitution object module of said user-specified version type from said database into said executable program of said user-specified version type.

2. A method comprising:
 compiling a user-specified source program into an augmented object module; and
 linking said augmented object module into an executable program of a user-specified version type, wherein if said version type is an ordinary version type, said augmented object module is linked into said executable program, else said linking comprising:
  i) determining whether or not a database holds a substitution object module that corresponds to said user-specified augmented object module, that is of said user-specified version type, and that is current;
  ii) if not, then further compiling said user-specified augmented object module into said corresponding substitution object module of said user specified version type and placing the same into said database; and
  iii) linking said corresponding substitution object module of said user specified version type from said database into said executable program of said user-specified version type.

3. A computer-readable storage medium having stored thereon a plurality of programming instructions for use by a processor, wherein execution of the plurality of programming instructions implements the method of:
 compiling a user-specified source program into an augmented object module; and linking said augmented object module into an executable program of a user-specified version type, wherein if said version type is an ordinary version type, said augmented object module it linked into said executable, else said linking comprising:
   i) determining whether or not a database holds a substitution object module that corresponds to said user-specified augmented object module, that is of said user-specified version type, and that is current;
   ii) if not, then further compiling said user-specified augmented object module into said corresponding substitution object module of said user-specified version type and placing the same into said database; and
   iii) linking said corresponding substitution object module of said user-specified version type from said database into said executable program of said user-specified version type.

4. A computer system comprising:
a compiler to compile a user-specified plurality of source programs into a plurality of augmented object modules, and to compile each said augmented object module into substitution object modules of a plurality of version types;
a database to hold program information and said substitution object modules; and
a linker, coupled to said compiler and to said database, to link a user-specified plurality of augmented object modules into an executable program of a user-specified version type, wherein for each said user-specified augmented object module, if said user-specified version type is an ordinary version type, said user-specified augmented object module is linked into said executable programs, else said linker to:
   i) determine, based on said program information and said substitution object modules within said database, whether or not said database holds a substitution object module that corresponds thereto, that is of said user-specified version type, and that is current;
   ii) if not, then invoke said compiler to further compile said user-specified augmented object module into said corresponding substitution object module of said user-specified version type and to place the same into said database;
   iii) update said program information; and
   iv) link said corresponding substitution object module of said user-specified version type from said database into said executable program of said user-specified version type.

5. The computer system of claim 4, wherein said specified version type is a debug version.

6. The computer system of claim 4, wherein said specified version type is an optimized version.

7. The computer system of claim 4, wherein said specified version type is an instrumented version.

8. The computer system of claim 4, wherein said augmented object module comprises a representation of said source program suitable for recompilation.

9. The computer system of claim 4, wherein said database is further to hold a representation of said source program suitable for recompilation.

10. The computer system of claim 4, wherein said augmented object module comprises a representation of said source program suitable for determining if different revisions of said source program are functionally equivalent.

11. The computer system of claim 4, wherein said database is further to hold a representation of said source program suitable for determining if different revisions of said source program are functionally equivalent.

12. The computer system of claim 4, wherein said augmented object module comprises a control-flow graph and an estimated run-time profile of each function held within said augmented object module.

13. The computer system of claim 4, wherein said database is further to hold a control-flow graph and an estimated run-time profile of each function held within said user-specified plurality of augmented object modules.

14. The computer system of claim 4, wherein said linker is further to determine what function-call sites are inlined.

15. The computer system of claim 4, wherein said linker is further to determine what data objects are placed in fast memory.

16. The computer system of claim 4, wherein said user-specified version type indicates at least two different version types of said plurality of augmented object modules and said corresponding substitution object modules to be linked.

17. The computer system of claim 4, wherein said linker to determine whether or not said database holds said substitution object modules is to:
   a) perform an initial link to determine what functions within said specified plurality of augmented object modules are to be included in said executable program;
   b) for each augmented object module whose compiler timestamp changed between the version in said augmented object module and the version in said database, said linker to mark each corresponding substitution object module within said database as not current;
   c) for each data object referenced in each function to be included, if the data object information of said data object has changed between the version in said augmented object module and the version in said database, said linker to mark all functions referencing that variable as having a propagating change;
   d) for each function to be included whose function equivalence representation changed between the version in said augmented object module and the version in said database, said linker to mark that function as having said propagating change;
   e) for each function to be included having an optimization decision that has changed between the version in said augmented object module and the version in said database, said linker to mark that function as having said propagating change;
   f) for each function having said propagating change, said linker to mark the functions that inline that function as having said propagating change, this step f) to continue until no more functions are marked; p1 g) for each substitution object module, said linker to mark it as not current if it contains any function marked as having said propagating change.

18. A method comprising:
compiling a user-specified plurality of source programs into a plurality of augmented object modules; and
linking said plurality of augmented object modules into an executable program of a user-specified version type, wherein for each said augmented object module, if said version type is an ordinary version type, said augmented object module is linked into said executable program, else said linking comprising:
   i) determining, based on program information within a database, whether or not said database holds a substitution object module that corresponds thereto, that is of said user-specified version type, and that is current;

ii) if not, then further compiling said augmented object module into said corresponding substitution object module of said user-specified version type and placing the same into said database;

iii) updating said program information; and iv) linking said corresponding substitution object module of said user-specified version type from said database into said executable program of said user-specified version type.

19. The method of claim 18, wherein said specified version type is a debug version.

20. The method of claim 18, wherein said specified version type is an optimized version.

21. The method of claim 18, wherein said specified version type is an instrumented version.

22. The method of claim 18, wherein said augmented object module comprises a representation of said source program suitable for recompilation.

23. The method of claim 18, wherein said database is further to hold a representation of said source program suitable for recompilation.

24. The method of claim 18, wherein said augmented object module comprises a representation of said source program suitable for determining if different revisions of said source program are functionally equivalent.

25. The method of claim 18, wherein said database is further to hold a representation of said source program suitable for determining if different revisions of said source program are functionally equivalent.

26. The method of claim 18, wherein said augmented object module comprises a control-flow graph and an estimated run-time profile of each function held within said augmented object module.

27. The method of claim 18, wherein said database is further to hold a control-flow graph and an estimated run-time profile of each function held within said user-specified plurality of augmented object module.

28. The method of claim 18, wherein said linking further comprises determining what function-call sites are inlined.

29. The method of claim 18, wherein said linking further comprises determining what data objects are placed in fast memory.

30. The method of claim 18, wherein said user-specified version type indicates at least two different version types of said plurality of augmented object modules and said corresponding substitution object modules to be linked.

31. The method of claim 18, wherein said determining whether or not said database holds said substitution object modules comprises:

a) performing an initial link to determine what functions within said specified plurality of augmented object modules are to be included in said executable program;

b) for each augmented object module whose compiler timestamp changed between the version in said augmented object module and the version in said database, marking each corresponding substitution object module as not current;

c) for each data object referenced in each function to be included, if the data object information of said data object has changed between the version in said augmented object module and the version in said database, marking all functions that reference that variable as having a propagating change;

d) for each function to be included whose function equivalence representation changed between the version in said augmented object module and the version in said database, marking that function as having said propagating change;

e) for each function to be included whose optimization decision changed between the version in said augmented object module and the version in said database, marking that function as having said propagating change;

f) for each function having said propagating change, marking the functions that inline that function as having said propagating change, and continuing this step f) until no more functions are marked;

g) for each substitution object module, marking it as not current if it contains any function marked as having said propagating change.

32. A computer-readable storage medium having stored thereon a plurality of programming instructions for use by a processor, wherein execution of the plurality of programming instructions implement the method of:

compiling a user-specified plurality of source programs into a plurality of augmented object modules; and linking said plurality of augmented object modules into an executable program of a user-specified version type, wherein for each said augmented object module, if said version type is an ordinary version type, said augmented object module is linked into said executable, else said linking comprising:

i) determining, based on program information within a database, whether or not said database holds a substitution object module that corresponds thereto, that is of said user-specified version type, and that is current;

ii) if not, then further compiling said augmented object module into said corresponding substitution object module of said user-specified version type and placing the same into said database;

iii) updating said program information; and iv) linking said corresponding substitution object module of said user-specified version type from said database into said executable program of said user-specified version type.

33. The computer-readable storage medium of claim 32, wherein said specified version type is a debug version.

34. The computer-readable storage medium of claim 32, wherein said specified version type is an optimized version.

35. The computer-readable storage medium of claim 32, wherein said specified version type is an instrumented version.

36. The computer-readable storage medium of claim 32, wherein said augmented object module comprises a representation of said source program suitable for recompilation.

37. The computer-readable storage medium of claim 32, wherein said database is further to hold a representation of said source program suitable for recompilation.

38. The computer-readable storage medium of claim 32, wherein said augmented object module comprises a representation of said source program suitable for determining if different revisions of said source program are functionally equivalent.

39. The computer-readable storage medium of claim 32, wherein said database is further to hold a representation of said source program suitable for determining if different revisions of said source program are functionally equivalent.

40. The computer-readable storage medium of claim 32, wherein said augmented object module comprises a control-flow graph and an estimated run-time profile of each function held within said augmented object module.

41. The computer-readable storage medium of claim 32, wherein said database is further to hold a control-flow graph and an estimated run-time profile of each function held within said user-specified plurality of augmented object modules.

42. The computer-readable storage medium of claim 32, wherein said linking further comprises determining what function-call sites are inlined.

43. The computer-readable storage medium of claim 32, wherein said linking further comprises determining what data objects are placed in fast memory.

44. The computer-readable storage medium claim 32, wherein said user-specified version type indicates at least two different version types of said plurality of augmented object modules and said corresponding substitution object modules to be linked.

45. The computer software of claim 32, wherein said determining whether or not said database holds said substitution object modules comprises:

- a) performing an initial link to determine what functions within said specified plurality of augmented object modules are to be included in said executable program;
- b) for each augmented object module whose compiler timestamp changed between the version in said augmented object module and the version in said database, marking each corresponding substitution object module within said database as not current;
- c) for each data object referenced in each function to be included, if the data object information of said data object has changed between the version in said augmented object module and the version in said database, marking all functions that reference that variable as having a propagating change;
- d) for each function to be included whose function equivalence representation changed between the version in said augmented object module and the version in said database, marking that function as having said propagating change;
- e) for each function to be included whose optimization decision changed between the version in said augmented object module and the version in said database, marking that function as having said propagating change;
- f) for each function having said propagating change, marking the functions that inline that function as having said propagating change and continuing this step f) until no more functions are marked;
- g) for each substitution object module, marking it as not current if it contains any function marked as having said propagating change.

* * * * *

UNITED STATES PATENT AND TRADEMARK OFFICE
CERTIFICATE OF CORRECTION

PATENT NO. : 5,850,554
DATED : December 15, 1998
INVENTOR(S) : Carver

It is certified that error appears in the above-identified patent and that said Letters Patent is hereby corrected as shown below:

<u>Column 16,</u>
Line 50, delete "p1".

Signed and Sealed this

Fifth Day of August, 2003

JAMES E. ROGAN
*Director of the United States Patent and Trademark Office*